Dec. 14, 1943.  J. M. LANGFORD  2,336,552
FITTING FOR OPENINGS IN THE WALLS OF LIQUID CONTAINERS
Filed March 17, 1942
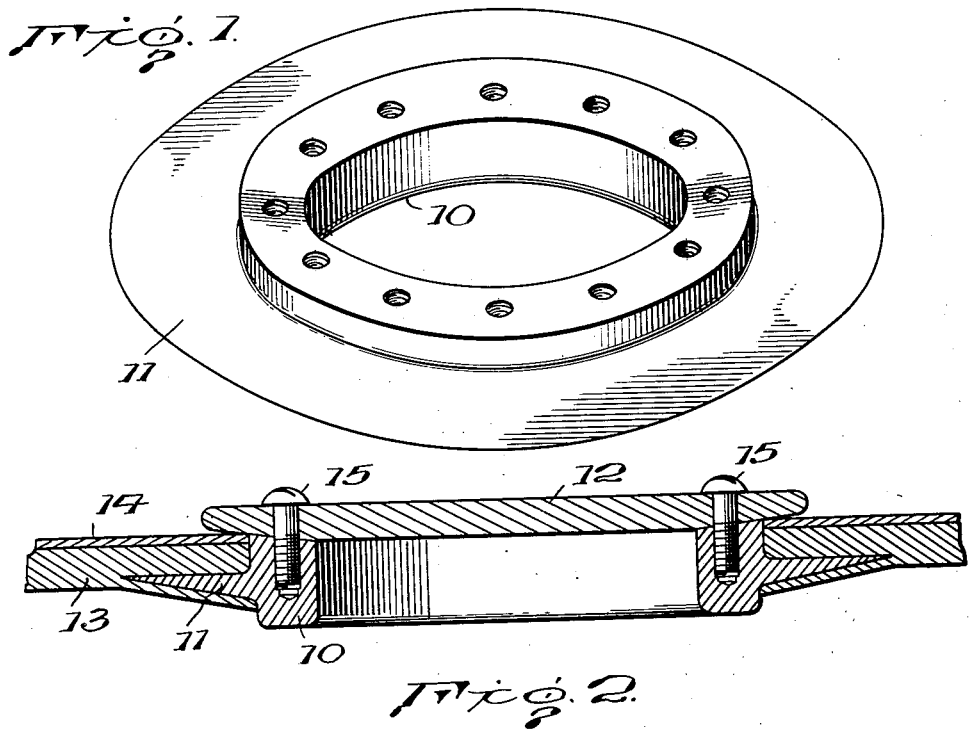
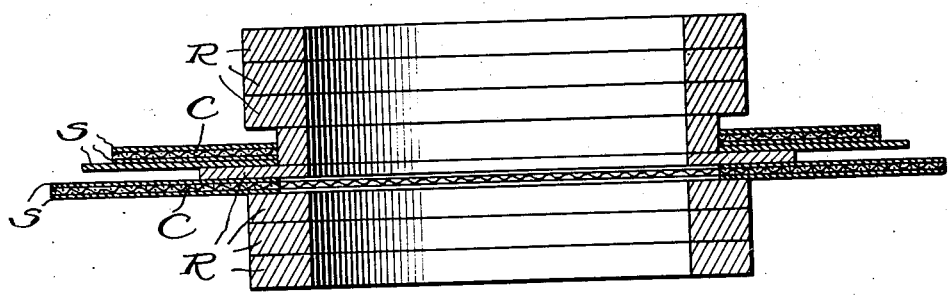
Inventor
John M. Langford,
By Church & Church
His Attorneys Patented Dec. 14, 1943

2,336,552

UNITED STATES PATENT OFFICE 2,336,552

FITTING FOR OPENINGS IN THE WALLS OF LIQUID CONTAINERS

John M. Langford, Auburn, N. Y., assignor to Columbian Rope Company, Auburn, N. Y., a corporation of New York Application March 17, 1942, Serial No. 435,081

1 Claim. (Cl. 220—63)

This invention relates to improvements in fittings for openings in the walls of liquid containers.

In the construction of fuel tanks, especially those used in aeroplanes of the combatant type, it has been the practice to use a "liner" or "bag" (the actual container for the gasoline) at the inner side of the tank to help prevent leakage when the tank is shot or pierced by projectiles and said liner or bag has been formed with an inner surface of a material that would also resist attack by the gasoline. For instance, a synthetic rubber composition known as "neoprene" has been commonly used for the inner surface of this liner or bag. However, due to the recent use of a new form of fuel, particularly in combatant planes, a fuel referred to as high percentage aromatic gasoline, the "neoprene" liner or bag and fittings formerly used in the fuel tanks have been so seriously attacked by the new fuel that their continued use is impractical. However, some of the other synthetics which are impervious to the aromatics present a problem in connection with the tank fittings because most fittings require metal inserts which can be readily tapped and threaded. For instance, one of these synthetics known as "Saflex" is not readily bonded to metal but I have discovered that it is possible to bond these synthetics to a moldable plastics composition which, when molded, can be easily machined and which is not only lighter than an equivalent metal body used as an insert in the fitting but which also reacts better than metal to gun fire.

The primary object of the present invention, therefore, is to provide a fitting that can be used for openings in the walls of liquid containers, and especially tanks containing this new type of aromatic fuel, without danger of the fittings and their mounting or connection in the container wall being attacked by the contents of the container.

A further object is to provide a fuel tank fitting molded of non-metallic materials immune to the contents of the tank, especially to that type of fuel having a relatively high percentage of aromatics therein.

Another object is to provide a non-metallic fitting for openings in the walls of leak-proof containers for high percentage aromatic gasoline wherein the wall has a liner immune to attack by said gasoline, said fitting being formed with a flange composed of a material which can be bonded to the liner and a body portion fitting the opening, made of a material to which the flange can be bonded and which can be machined for attachment of a closure plate or for other purposes.

Still another object of the invention is to provide a molded, non-metallic fitting of a composite nature in that one portion thereof is rigid and sufficiently hard to permit machining of its surface and another portion thereof is resilient in order to facilitate attachment of the fitting in the container wall without danger of distortion of the wall structure.

A still further object is to provide a molded, non-metallic fitting which is of a composite nature, as indicated, but in which the components are substantially integrated.

More especially, the invention contemplates a fitting having a hard, rigid body portion and a resilient, peripheral flange for attachment to the container wall, said body portion being formed of a fibrous filler and a phenolic resinous binder of the heat-hardening type, while said flange is formed of a synthetic or thermo-plastic substance with or without a filler, all of said materials being immune to attack by the aromatic fuel and said thermo-plastic substance being capable of being bonded to the materials used in said body portion.

With these and other objects in view, the invention consists in certain details of construction and combinations and arrangements of parts, all as will hereinafter be more fully described and the novel features thereof particularly pointed out in the appended claim.

In the accompanying drawing—

Figure 1 is a perspective view of a molded fitting

Figure 2 is a sectional view through a container wall illustrating a hand hole fitting and cover; and Figure 3 is a diagrammatical illustration of what is believed at the present to be the preferred manner of assembling the material for molding the fitting.

It will be understood that the present invention is not limited to the production of the particular hand hole fitting disclosed in the drawing. The hand hole fitting is merely adopted for purpose of illustration and a number of different fittings for containers or gasoline tanks, for instance, the gauge mounts, filler neck, sump fitting and vent fittings may be, and preferably are, produced according to the present invention, especially where the container is used for storage of liquid which will detrimentally attack fittings formerly utilized.

The hand hole fitting illustrated comprises an annular body portion 10 and a peripheral flange 11 which may extend entirely around the body. As previously stated, it has been found that the new, so-called high percentage aromatic gasoline fuel attacks the bond between the metallic inserts and the old "neoprene" liner, so that it is impractical to use such metallic inserts in containers for such fuels. I have discovered that fittings made of certain moldable compositions will not only overcome this difficulty, but, by using different types of synthetic materials, portions of fittings molded therefrom may be made rigid and extremely hard, while other portions may be made resilient to more readily conform to the shape and any irregularities of the liner in the container wall. For instance, in the hand hole fitting the molded body 10 can be made extremely hard, so that its surface can be machined to permit attachment and a close fit of the hand hole cover 12. On the other hand, the flange 11 by which the fitting is attached to or in the liner 13 within the tank wall 14 may be made resilient whereby it will readily conform to the original contour of the liner or wall and also readily accommodate itself to any normal distortion to which the liner or wall might be subjected.

Preferably, for the body portion 10, a moldable composition of a filamentary filler material and a thermo-setting binder is used. The filler material is preferably vegetable fibers in lengths such that they can be tied together, so to speak, on the ordinary textile machine known as a needling machine. The binder may be a phenol resin binder of the heat-hardening type. A full disclosure of the preferred form of moldable composition for the body 10 of the fitting can be found in United States Letters Patent, No. 2,249,888, dated July 22, 1941.

For the resilient flange 11, I have found that a number of synthetic materials not subject to attack by the aromatic fuel may be used with or without a filler. This class of synthetic materials includes those known at the present time under the trade names "Saflex"; "Royalin"; "Chemigum" and "Buna." Where a filler is used in the flange, soft, loosely woven (open weave) canvas is preferred. However, the synthetic material is usually used in sheet form and the use of the canvas is not absolutely necessary.

In producing a hand hole fitting, a number of rings R cut from sheets of the moldable material, are laminated, as illustrated in Fig. 3, and wider rings S of the synthetic material, constituting the flange, are associated with the several rings R. Where canvas is used in the flange, the same may be positioned between two layers of the synthetic material as illustrated at C. This built-up mass is then molded under heat and pressure in a closed mold, but, if canvas is used in the flange 11 with "Saflex" care must be exercised not to subject the synthetic material of the flange to excessive temperature. For instance, in prior practices, the filler with the thermo-setting resinous binder has usually been cured at approximately 300° F., but at this temperature the flow of synthetics, such as "Saflex" becomes excessive, so that the canvas is exposed so that the finished article would present the appearance of poor workmanship. However, by holding the curing temperature below 250° F., or at approximately 240° F., all these difficulties are overcome. However, where "Buna" is used, the cure of the fitting may be effected at a temperature of 300° F., as this synthetic does not have the flow properties possessed by "Saflex."

When "Saflex" is used, the molded piece is cooled in the mold under continued pressure, preferably by circulating a cooling fluid through the heating system of the mold, while maintaining a pressure of around 1800 pounds per square inch on the molded body. The molded article may be removed when outer surface temperature of the mold is reduced to approximately 130° F. This curing effects a bond between the flange 11 and body 10 to produce a substantially integral mass, but to lend strength to this union a mechanical interlock is formed between the two portions by having the inner edges of the canvas C and rings S inserted between the rings R when assembling the several layers of material, as shown in Fig. 3, preparatory to the molding or curing step.

When "Buna" or "Royalin" is used, the molded piece is cured under the same pressure and temperature conditions but it is not necessary to cool the mold, as in the case of "Saflex," before removing the molded article.

The density or hardness of the rigid body portion 10 is such that its surface can be machined and holes drilled and threaded whereby the cover 12 for the opening can be secured by screws 15 with a close-leak-proof fit. When installed in the container, the flange 11 of the fitting is preferably inserted in an annular recess around the hand hole opening in the, so-called, liner 13 and bonded thereto.

The present fitting possesses numerous advantages over the metallic fittings heretofore used, especially in gasoline fuel tanks of combatant aircraft. Usually, brass and aluminum were used and, compared with these metals, the present fitting is considerably lighter in weight. For instance, the moldable material of the body portion 10 has a specific gravity of 1.35 and that of the flange is 1.28; whereas, the specific gravity of aluminum is 2.77 and that of brass is 8.60. Again, the present fitting does not shatter like the above metals when hit, in that it will break with a ragged tear. It does not rupture with an abrupt or clean break, as does brass and aluminum, both of which shatter in fragments which have a shrapnel effect on surrounding objects. Again, the more or less substantial correspondence between the specific gravities of the materials used in the present fitting overcomes the tendency to rupture the bond between the molded component parts. Also the similarity of the specific gravities of the two materials, eliminates the noise or "drumming" that is observed where brass and aluminum are used. As also previously mentioned, none of the materials used in the present fitting are affected by the, so-called, high percentage aromatic fuels so that the junction between the fitting and container wall is not destroyed by the fuel. So far as concerns this junction or attachment between the fitting and the container wall, the present fitting also possesses the advantage of being capable of being securely bonded to said wall, a result not obtainable where it was attempted to use metallic fittings in conjunction with liners immune to attack by high percentage aromatic gasoline.

It will be appreciated that fittings of various shapes can be molded from the present materials, so that gauge mounts, filler necks, sump fittings, vent fittings, and any others that are subjected to the aromatic fuel may all be produced in accordance with the present invention. This being true, it is apparent that the total saving in weight may be considerable, a factor of prime importance in aircraft design and production.

What I claim is:

A non-metallic fitting for openings in the walls of containers for high percentage aromatic gasoline wherein said wall comprises a liner having a layer of material immune to attack by the gasoline, said fitting consisting of an annular rigid body portion with a resilient peripheral flange, said body portion being composed of a moldable composition of vegetable fiber filler and a phenolic-resin binder capable of being set by the application of heat and pressure to impart hardness and rigidity to said body to permit machining thereof, and said flange being formed of a moldable composition of a filler and a resilient synthetic binder also capable of being set under heat and pressure without destroying the resiliency of the molded flange, the binder for said flange being resistant to the contents of said container and capable of being bonded to said body portion to produce substantial integrality between the body and flange of said fitting and said binder for the flange also being capable of being bonded to the liner of the container wall.

JOHN M. LANGFORD.